E. P. FENN.
Feed-Water Heaters for Steam-Boilers.

No. 147,624. Patented Feb. 17, 1874.

WITNESSES.
Henry N. Miller
C. L. Evert.

INVENTOR.
Edward P. Fenn,
By Alexander &c.
Attorneys.

UNITED STATES PATENT OFFICE.

EDWARD P. FENN, OF ST. LOUIS, MISSOURI.

IMPROVEMENT IN FEED-WATER HEATERS FOR STEAM-BOILERS.

Specification forming part of Letters Patent No. 147,624, dated February 17, 1874; application filed September 24, 1873.

*To all whom it may concern:*

Be it known that I, EDWARD P. FENN, of St. Louis, in the county of St. Louis and in the State of Missouri, have invented certain new and useful Improvements in Apparatus for Heating Feed-Water; and do hereby declare that the following is a full, clear, and exact description thereof, reference being had to the accompanying drawings and to the letters of reference marked thereon making a part of this specification.

The nature of my invention consists in the construction and arrangement of a feed-water heater for steam-boilers, as will be hereinafter more fully set forth.

In order to enable others skilled in the art to which my invention appertains to make and use the same, I will now proceed to describe its construction and operation, referring to the annexed drawing, in which—

Figure 1:
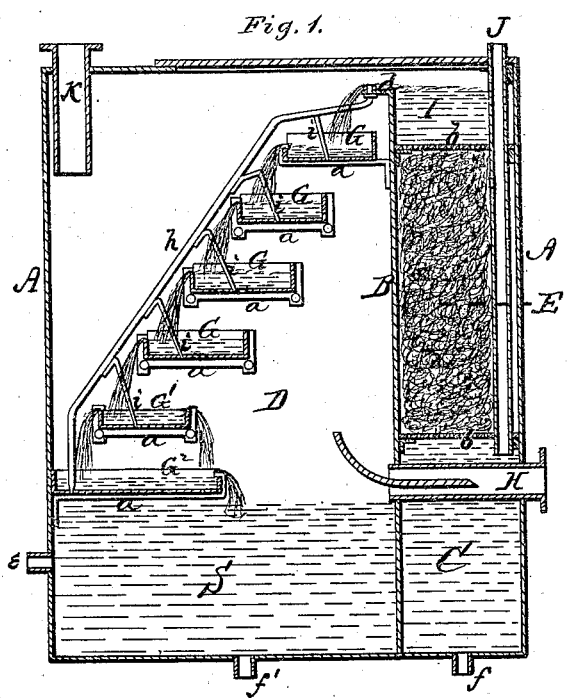
Figure 2:
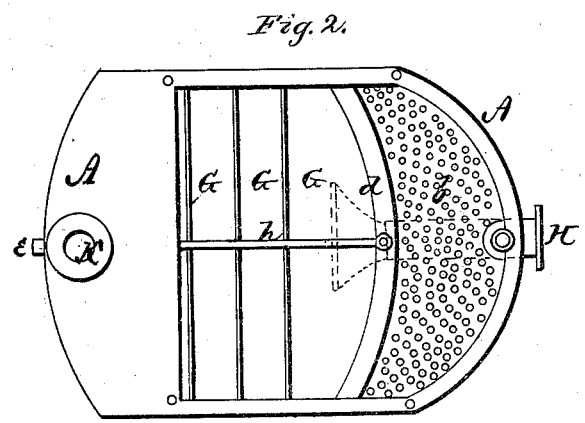

Figure 1 is a longitudinal vertical section of my feed-water heater; and Fig. 2 is a plan view of the same, with the top plate removed.

A represents the shell of my feed-water heater, made in any desired form, either cylindrical or with flat sides, or in oval form, as shown. This shell is, by a vertical partition, B, near one end, divided into a receiving-chamber, C, and heating-chamber D. G G represent a series of pans, of cast-iron or other suitable material, arranged in step form from the upper end of the partition B downward to the opposite side of the heating-chamber D, and extending the entire distance across the same. These pans are supported upon brackets $a\ a$, and the water flows through them for the purpose of catching deposits which may be precipitated by the action of the heat. In the receiving-chamber C are two screens, $b\ b$, between which the filtering material E is placed, and below the lower screen is the inlet-pipe H, for the exhaust steam from the engine. Above the upper screen $b$ is formed a chamber, I, from which the water is discharged into the pans G G, over a dam or flange, $d$, the water flowing in a broad sheet the entire length of the pan. J is the receiving-pipe passing through the filtering material, into the receiving-chamber C, directly on the steam-inlet pipe H. K is the escape-pipe for the exhaust steam after having passed through the sheet of water overflowing the pans. $e$ is the hot-water pipe supplying the pump and boilers. $f$ and $f'$ are mud-pipes for discharging mud or water from the receiving-chamber C and heating-chamber D, respectively. Over the center of the pans G G passes a brace, $h$, with a point, $i$, resting in a socket in each pan to secure them firmly in position, as shown in Fig. 1. Water entering the receiving-pipe J is discharged upon the exhaust-steam inlet-pipe H, fills the receiving-chamber C, and is forced, by pressure from the tank, hydrant, or fountain-head above, upward through the filter E. Sediment which may thus be held below is drawn off at $f$. The chamber I above the filter being filled, the water overflows the dam $d$, into the first pan G, forming an unbroken sheet across the heating-chamber D the entire length of the dam $d$. The flanges on the back and ends of each pan, except the lowest two, which are marked $G^1$ and $G^2$, are higher than the flanges on the front, so that the water must flow from one to another over the front flange, excepting from the pan $G^1$, of which the flanges on each side are equal, and the flow is over each alike into the large pan $G^2$, from which it flows over the flange toward the center of the heating-chamber, this flange being the lowest in this pan. From the reservoir S, formed by the lower portion of the heating-chamber D, the water is drawn through the feed-pipe $e$, to the pump or boilers. The exhaust steam enters through the pipe H directly against the sheet of water falling from the two lowest pans $G^1\ G^2$, and the steam can only reach the escape K by passing through the sheet of water flowing from one pan to another.

By my device, as thus constructed, the water is passed upward through a filter before it reaches the heating-chamber or the precipitating-pans.

It is a well-established fact that, in proportion as mud or other earthy substances, which can only be extracted by filtration, is mixed with lime or other mineral substances in water, just in that proportion will the latter remain in solution, no matter to what degree of heat it may be subjected. In other words, when both mud and lime are together in solution, the mud must be filtered out before the lime can be precipitated.

The heaters generally in use filter the water after it has passed the heating-chamber, and hence necessarily fail, under the above conditions, to prevent boiler incrustations, which is the grand object of this class of feed-water heaters. As stated above, I reverse this order and filter the water first, thereby removing all the mud, and then heat it, precipitating the lime.

Great condensation of steam and a most thorough heating of water are accomplished by allowing the water to enter the heating-chamber in a broad sheet over the dam $d$, and by so arranging this broad sheet in its flow that all the steam must pass through it before escaping. The water is partially heated before filtering by passing the exhaust-pipe H through the receiving-chamber C, and discharging the water from the receiving-pipe J directly upon it; and said receiving-pipe, being passed through the filter, is protected from cold, and the heat of the filter utilized.

Having thus fully described my invention, what I claim as new, and desire to secure by Letters Patent, is—

1. The combination, in a feed-water heater, of a casing, A, having a partition, B, inclosing a receiving-chamber, C, at the bottom, a steam-inlet pipe, H, a filter, E, above the chamber, and a water-inlet pipe, J, which receives the water at the top and discharges it into the chamber above the steam-inlet pipe, all substantially as and for the purposes set forth.

2. The pans $G\ G^1\ G^2$, arranged in step form within the chamber D, as and for the purposes set forth.

3. The combination, with the pans $G\ G^1\ G^2$, of the brace $h$ and points $i\ i$, substantially as and for the purposes herein set forth.

4. The dam $d$, at the top of the partition B, in combination with the chamber I and pans G, as and for the purposes set forth.

5. The combination of the receiving-chamber C, steam-inlet pipe H, filter E, dam $d$, heating-chamber D, pans $G\ G^1\ G^2$, and outlet K, all constructed and arranged substantially as and for the purposes herein set forth.

In testimony that I claim the foregoing I have hereunto set my hand this 26th day of August, 1873.

EDWARD P. FENN.

Witnesses:
W. J. SULLIVAN,
JOHN M. KRUM.